Patented Mar. 14, 1939

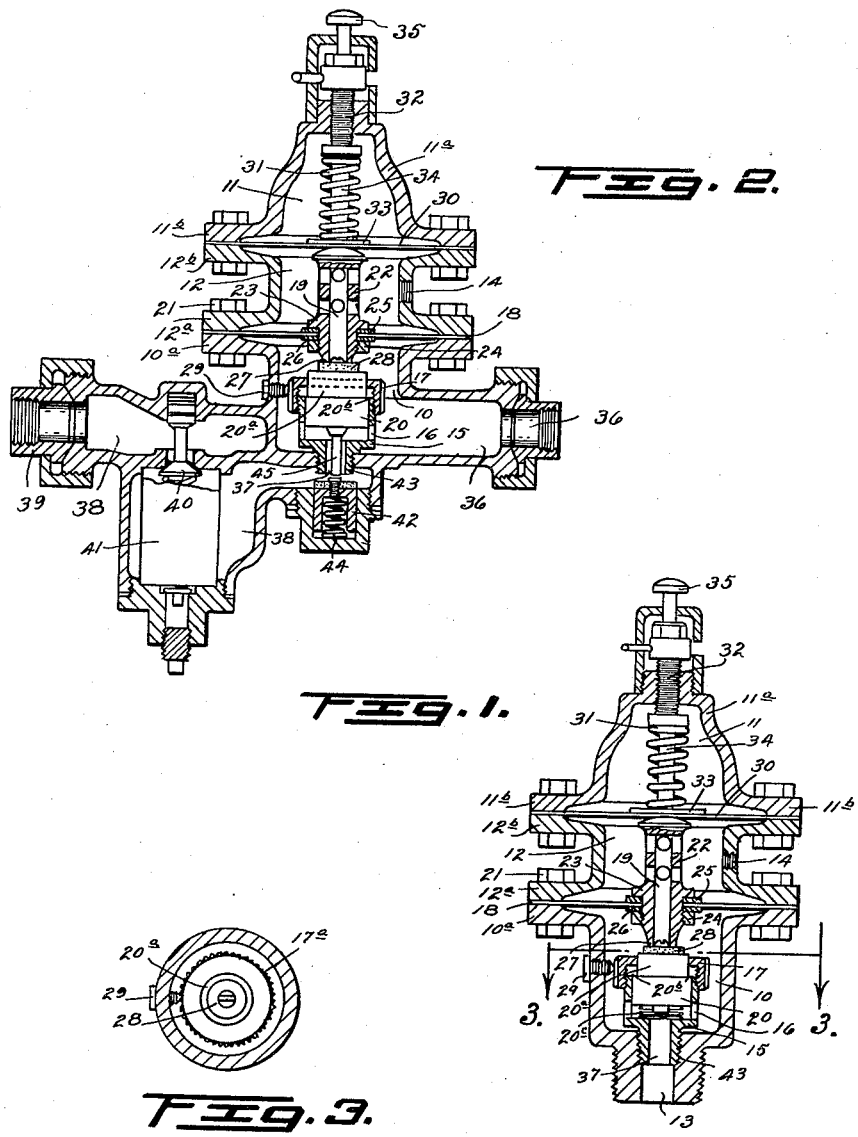

2,150,460

UNITED STATES PATENT OFFICE 2,150,460

PRESSURE CONTROL MECHANISM

George Henry Riches, Cooksville, Ontario, Canada, assignor to Patent Development Company Limited, Toronto, Ontario, Canada Application January 12, 1937, Serial No. 120,283

7 Claims. (Cl. 50—23)

This invention relates to a pressure control mechanism for a heating system for maintaining the heating fluid under pressure and between a maximum and minimum of pressures. One of the objects of this invention is to construct the valve mechanism in such a manner as to permit the spring means employed in the said valve to be sealed out of contact with the heating fluid.

The relief valve mechanism and pressure control mechanism heretofore employed comprised a housing having an outlet opening adapted for communication with the system, an inlet port and a discharge port and a relief mechanism on the discharge side consisting of a reciprocable member responsive to pressure variations, a passage through said diaphragm communicating with the discharge port, a valve normally closing said passage, a spring acting on the diaphragm against the pressure within the system and means for unseating the said valve when the reciprocable member moved in response to excess pressure within the body.

The object of the present invention is attained by mounting the relief valve in a guide member, mounting on the guide member an adjustable means engageable with the valve for unseating the same after a predetermined travel of the diaphragm in response to excess pressure within the heating system and mounting the spring means acting on the diaphragm in a chamber which is sealed against the admission thereto of the heating fluid within the system.

This may be accomplished in several different ways but in the following description I propose to describe the preferred form which my invention may take.

The manner in which the objects of my invention are accomplished are fully set forth in the following description and illustrated in the accompanying drawing in which Figure 1 is a vertical sectional view of a pressure relief valve constructed in accordance with the present invention.

Figure 2 is a vertical sectional view of a pressure mechanism for controlling water pressure systems within maximum and minimum predetermined limits employing my invention.

Figure 3 is a sectional view on the line 2—2, Figure 2.

Like characters of reference refer to like parts throughout the specification and drawing.

Referring first to Figure 1 which illustrates a pressure relief mechanism designed to relieve excess pressure. The device there illustrated consists of a hollow housing divided into three separable chambers comprising an inlet chamber 10, a compression chamber 11 and a discharge chamber or passage 12. The inlet chamber 10 is provided with an inlet port 13 and the discharge chamber 12 is provided and formed with a discharge port 14. Mounted within the inlet chamber is a cup shaped member 15 which is provided at the lower end with an outlet 16 and at the upper end with a ring 17 which is threaded thereon. The exterior surface of the ring 17 is formed with serrations or teeth 17a for the purpose hereinafter mentioned.

The pressure relief mechanism comprises a reciprocable member 18, movable in response to pressure variations within the body, a passage 19 therethrough communicating with the discharge chamber 12 and a valve member 20 normally closing said passage. The reciprocable member 18 is engaged between the opposing faces of the flanges 10a and 12a formed at the upper and lower end of the walls forming respectively the chamber 10 and the discharge chamber 12, which flanges are held in fluid tight engagement by means of bolts 21. The passage 19 is formed by the tubular member 22 which extends through the reciprocable member and is secured thereto in any suitable manner such as by providing the member 22 with a shoulder 23 which will engage with the upper surface of the reciprocable member and a lock ring 24 threaded onto the lower extremity of the member 22 and which engages with the under side of the reciprocable member. It is of advantage to reinforce the reciprocable member above and below, with rings 25, which engage respectively with the shoulder 23 and the ring 24. The lower extremity of the member 22 terminates in a valve seat 27 while the upper end extends well into the discharge chamber 12 for a purpose set forth later on in the description. The valve member 20 is made circular and is slidably entered in the cup shaped member 15. The valve member 20 is substantially wide in cross sectional area so that it will be closed and maintained seated by the pressure within the inlet chamber. The spring 20c which is located between the bottom of the member 20 and the bottom of the cup shaped member serves to counter-balance the weight of the member 20. The valve member is provided or formed, at the upper end thereof, with a narrowed portion 20a which extends upwardly through the ring 17 which is adapted to engage with the shoulder 20b; mounted on the top of the valve member 20 is a valve disc 28 which engages with the valve seat 27. Entered through the wall of the chamber 10 in a manner so that it will engage with the teeth 17a of the ring 17 is a lock screw 29 which serves the purpose of locking the ring 17 in its set position.

The compression chamber 11 is located on the discharge side of the reciprocable member 18 and is formed by the walls 11a of the chamber and the flexible diaphragm 30. The flexible diaphragm 30 is engaged between the opposing faces of the flanges 11b and 12b formed on the lower and upper ends respectively of the walls 11a of the chamber 11 and the walls of the chamber 12. It will be seen from this construction that the discharge passage 12 is flexible and is defined by the reciprocable member 18 and the flexible diaphragm 30. It will be noted that the member 22 extends to and engages with the under side of the flexible diaphragm 30, the upper end of the member 22 being slightly spherical in shape in order to prevent piercing of the diaphragm. Located within the compression chamber 11 is a compression spring 31 which acts on the reciprocable member 18 through the member 22 and the diaphragm 30, resisting the movement of the reciprocable member under the force of the pressure within the chamber 10. The adjustment of the pressure of the spring is effected by a compression screw 32 which is screw threaded through the top wall of the chamber 11 in axial alignment with the valve disc 28. The force of the compression spring 31 is not carried directly on the diaphragm but on a washer 33 which is permanently secured to the diaphragm. The compression screw is formed with a central bore through which is slidably entered a movable pin 34, the inner end of which is connected to the washer 33 and the outer end being extended beyond the top of the head of the compression chamber and terminating in a cap 35.

A control valve such as illustrated in Figure 2 is constructed in a manner somewhat similar to the relief valve which has just been described but necessarily requires certain modifications or alterations as will properly adapt it to such use. It is now well known that control valves are employed for controlling water pressure systems such as a hot water heating system within predetermined maximum and minimum limits. The additional features and modifications are hereinafter described. The chamber 10 is provided or formed with an outlet passage 36 adapted to be connected to the pressure system and an inlet passage 37 directly below and in axial alignment with the valve member 20 and an inlet channel 38 which communicates with the inlet 37 and a source of water supply indicated by the pipe 39. Located in the inlet channel 38 is a check valve 40 which is provided to prevent a reverse flow of fluid and a screen 41 for the purpose of filtering the water before it is admitted to the pressure control device. Located in the channel 36 directly below the inlet 37 is an inlet valve 42 which seats against the valve seat 43 formed on the inlet side of the inlet 37. The valve member 42 is supported on a spring 44 which prevents its falling away from the seat 43 when open. The valve member 20 is provided or formed with a downwardly extending pin 45 which engages with the valve disc 42. The spring 20c may be omitted as its function is performed by the spring 44.

The device illustrated in Figure 1 is adjusted to operate at the correct pressure in the following manner. To set the valve to open at the predetermined pressure, the set screw 29 is removed and a tool or instrument is inserted in the hole and the ring 17 is rotated thereby, either clockwise or anti-clockwise, depending on whether an increase or decrease of pressure is desired, to a position at which the ring 17 will engage with the shoulder 20b when the pressure, at which it is desired to unseat the disc 28, is reached. When the correct position is attained for the ring 17, the lock screw 29 is re-inserted, the inner end of the same engaging with the teeth 17a on the ring 17, locking it in position.

In the device shown in Figure 2, the pressure of the spring 31 regulates the pressure at which the valve 42 will open to admit an additional supply of fluid into the chamber 10 and the ring 17 regulates the pressures at which excess pressure will be released. The valve shown in Figure 2 is regulated by turning the compression screw 32 until it has sufficient tension to allow the inlet valve 42 to close when the correct minimum pressure is attained within the chamber 10 and the system to which the inlet chamber is connected through the outlet 36. The pressure relief mechanism is regulated as hereinbefore described by means of the ring 17.

The correct functioning of the pressure relief mechanism and the inlet valve may be ascertained by means of the pin 34 with which the device is provided. By lifting upwardly on the pin 34, the reciprocable member will be moved upwardly a sufficient distance to allow the valve member 20 to be unseated by the ring 17. If the valve is functioning properly water will discharge through the outlet 14. To test the inlet valve, downward pressure is exerted on the pin forcing the reciprocable member downwardly to actuate the valve 42 away from its seat. If this latter valve is functioning properly, water will be admitted to the chamber 10 which will cause an increase in pressure to be indicated on the pressure gauge with which all pressure systems are provided.

Having thus fully described my invention, what I claim as new and desire to secure by Letters Patent is:

1. A pressure control mechanism for a heating system for maintaining the heating fluid within the system between a maximum and a minimum predetermined pressure, comprising a sectional casing having an inlet adapted for connection to a source of water under a pressure in excess of the minimum pressure in the system, an outlet adapted for connection to the system, and a discharge for excess pressure, a transverse partition between the inlet and outlet, an imperforate diaphragm above the discharge anchored between the sections to form a chamber above the discharge sealed against the admission thereto of fluid from the system, a second diaphragm anchored between the sections of the casing and located between said inlet and discharge, said diaphragms forming a flexible discharge passage communicating with the discharge and movable in response to pressure variations within the system, said second mentioned diaphragm having a passage therethrough communicating with the discharge, a valve seat carried by said second mentioned diaphragm, a laterally ported guide member mounted on said partition and having a valve seat communicating with the inlet, a valve normally closing said last mentioned passage and slidably mounted in said guide member, said valve being movable with said second diaphragm to remain seated during predetermined travel of the diaphragm in response to pressure variations below the maximum pressure, spring means within the closed chamber acting on said diaphragms against the movement thereof in response to pressure increase within said system, and means carried by said guide member to engage and unseat said valve when the diaphragms move in response to pressure within the system in excess of the maximum pressure, an inlet valve normally closing said inlet and means actuated by the diaphragms for unseating said last mentioned valve when the diaphragms move in response to a decrease in the pressure within the system below the predetermined minimum.

2. A pressure control mechanism for a heating system for maintaining the heating fluid within the system between a maximum and a minimum predetermined pressure, comprising a sectional casing having an inlet adapted for connection to a source of water under a pressure in excess of the minimum pressure in the system, an outlet adapted for connection to the system, and a discharge for excess pressure, a transverse partition between the inlet and outlet, an imperforate diaphragm above the discharge anchored between the sections to form a chamber above the discharge sealed against the admission thereto of fluid from the system, a second diaphragm anchored between the sections of the casing and located between said inlet and discharge, said diaphragms forming a flexible discharge passage communicating with the discharge and movable in response to pressure variations within the system, a strut member mounted on one of the diaphragms and engaging with the other diaphragm, said second mentioned diaphragm having a passage therethrough communicating with the discharge, a valve seat carried by said second mentioned diaphragm, a laterally ported guide member mounted on said partition and having a valve seat communicating with the inlet, a valve normally closing said last mentioned passage and slidably mounted in said guide member, said valve being movable with said second diaphragm to remain seated during predetermined travel of the diaphragm in response to pressure variations below the maximum pressure, spring means within the closed chamber acting on said diaphragms against the movement thereof in response to pressure increase within said system, and means carried by said guide member to engage and unseat said valve when the diaphragms move in response to pressure within the system in excess of the maximum pressure, an inlet valve normally closing said inlet and means actuated by the diaphragms for unseating said last mentioned valve when the diaphragms move in response to a decrease in the pressure within the system below the predetermined minimum.

3. A pressure control mechanism for a heating system for maintaining the heating fluid within the system between a maximum and a minimum predetermined pressure, comprising a sectional casing having an inlet adapted for connection to a source of water under a pressure in excess of the minimum pressure in the system, an outlet adapted for connection to the system, and a discharge for excess pressure, a transverse partition between the inlet and outlet, an imperforate diaphragm above the discharge anchored between the sections to form a chamber above the discharge sealed against the admission thereto of fluid from the system, a second diaphragm anchored between the sections of the casing and located between said inlet and discharge, said diaphragms forming a flexible discharge passage communicating with the discharge and movable in response to pressure variations within the system, said second mentioned diaphragm having a passage therethrough communicating with the discharge, a valve seat carried by said second mentioned diaphragm, a laterally ported guide member mounted on said partition and having a valve seat communicating with the inlet, a valve normally closing said last mentioned passage and slidably mounted in said guide member, said valve being movable with said second diaphragm to remain seated during predetermined travel of the diaphragm in response to pressure variations below the maximum pressure, spring means within the closed chamber acting on said diaphragms against the movement thereof in response to pressure increase within said system, and means carried by said guide member to engage and unseat said valve when the diaphragms move in response to pressure within the system in excess of the maximum pressure, an inlet valve normally closing said inlet and remaining seated during movement of the diaphragms in response to pressure variations in excess of the minimum pressure, and strut means located between said valves to unseat the inlet valve when the diaphragms move in response to a pressure within the system below the minimum pressure.

4. A pressure relief valve for a heating system comprising a hollow body having an inlet chamber, an inlet port for said chamber, a second chamber sealed against the admission thereto of fluid from the system and a flexible discharge chamber, a discharge port for the discharge chamber, a pressure relief mechanism between said ports comprising a reciprocable member movable in response to pressure variations, said member having a passage therethrough coaxial with the inlet port and communicating with the discharge chamber, a valve seat carried by said member, a laterally ported guide member mounted within said inlet chamber in axial alignment with said inlet port and communicating therewith, a valve slidably mounted in said guide member and co-operating with said seat and movable in engagement therewith during a predetermined movement of said reciprocable member in response to pressure variations within said system, spring means within the second mentioned chamber acting on said reciprocable member to resist the movement thereof in response to pressure increase, an adjustable stop carried by said guide member to engage said valve after predetermined movement of said valve seat and valve with the reciprocable member to cause separation of said seat and valve under the influence of excess pressure.

5. A pressure relief valve for a heating system comprising a hollow body having an inlet chamber, an inlet port communicating therewith, a discharge chamber, and a discharge port, a pressure relief mechanism between said ports comprising a reciprocable member movable in response to pressure variations within the system, said member having a passage therethrough coaxial with the inlet port and communicating with the discharge chamber, a valve seat carried by said member on the inlet side thereof, a guide member mounted within said inlet chamber in axial alignment with said inlet port, a valve slidably mounted in said guide member and co-operating with said seat and movable in engagement therewith during predetermined movement of said reciprocable member in response to pressure variations within the inlet chamber, an imperforate flexible diaphragm above the discharge port forming a chamber sealed against the admission thereto of fluid from the system, a strut member engaging with said reciprocable member and said diaphragm, spring means within the last mentioned chamber acting on said reciprocable member against the movement thereof in response to pressure increases within the system, and stop means carried by said guide member to engage said valve for unseating same after predetermined travel of said reciprocable member in response to an increase of pressure within the inlet chamber.

6. A pressure relief valve for a heating system, comprising a hollow body having an inlet chamber, a compression chamber sealed against the admission thereto of fluid from the system and a flexible discharge chamber, a pressure relief mechanism controlling the passage of fluid to the discharge chamber, comprising a reciprocable member movable in response to pressure variation within the body, said member having a passage therethrough communicating with the discharge chamber, a valve seat carried by said member, a guide member mounted within said inlet chamber in axial alignment with said inlet port and communicating therewith, a valve slidably mounted in said guide member and co-operating with said seat and normally maintained on said seat by the pressure within the system and movable in engagement therewith during predetermined movement of the said reciprocable member in response to an increase of pressure within the system, spring means within the compression chamber acting on said reciprocable member to resist the movement thereof in response to pressure increase within said system, an adjustable stop carried by the guide member to engage said valve and maintain the same stationary after predetermined travel of said valve seat and valve with the reciprocable member whereby continued movement of the reciprocable member and valve seat under the influence of a further increase of pressure within the system will cause separation of said seat and valve and means permitting the adjustment of said stop.

7. A pressure relief valve for a heating system, comprising a hollow body having an inlet chamber, a compression chamber sealed against the admission thereto of fluid from the system and a discharge chamber, a pressure relief mechanism controlling the passage of fluid to the discharge chamber, comprising a reciprocable member movable in response to pressure variation within the body, said member having a passage therethrough communicating with the discharge chamber, a valve seat carried by said member, a guide member mounted within said inlet chamber, a valve slidably mounted in said guide member and co-operating with said seat and normally maintained on said seat by the pressure within the system and movable in engagement therewith during predetermined movement of the said reciprocable member in response to an increase of pressure within the system, spring means within the compression chamber acting on said reciprocable member to resist the movement thereof in response to pressure increase within said system, an adjustable stop within the inlet chamber to engage said valve and maintain the same stationary after predetermined travel of said valve seat and valve with the reciprocable member whereby continued movement of the reciprocable member and valve seat under the influence of a further increase of pressure within the system will cause separation of said seat and valve and means permitting the adjustment of said stop.

GEO. H. RICHES.